March 19, 1968 R. B. ADAMS 3,373,759

FLOW CONTROL APPARATUS

Filed Jan. 21, 1965 2 Sheets-Sheet 1

INVENTOR
ROBERT B. ADAMS

BY B.T.Wobensmith

ATTORNEY

March 19, 1968  R. B. ADAMS  3,373,759
FLOW CONTROL APPARATUS
Filed Jan. 21, 1965  2 Sheets-Sheet 2
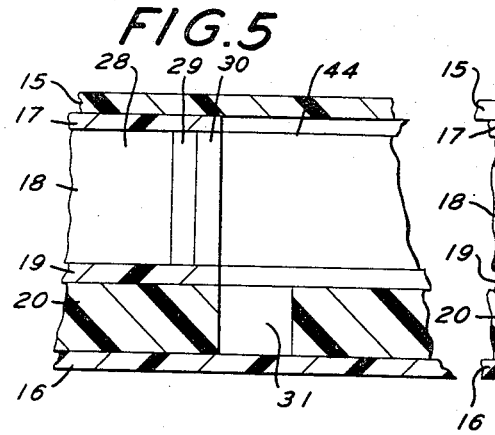
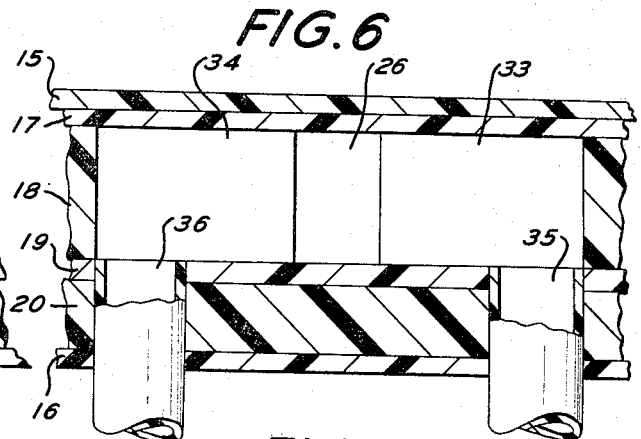
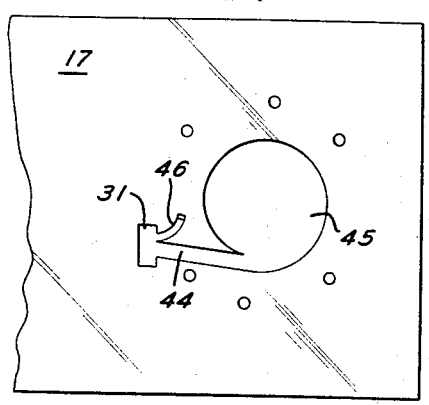
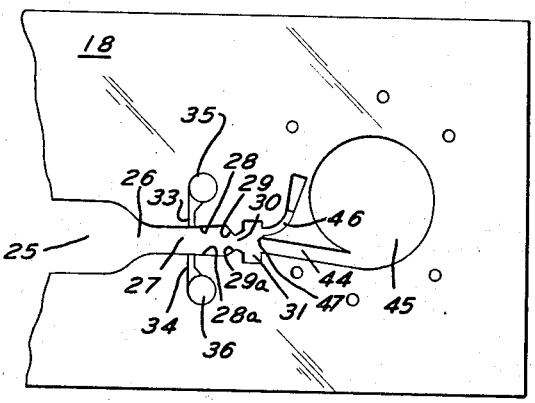
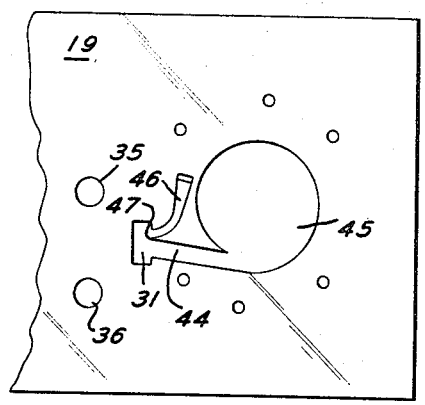
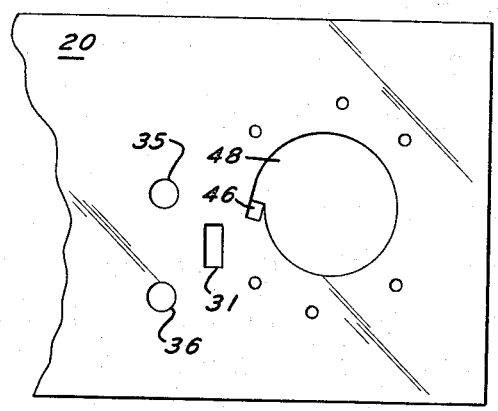
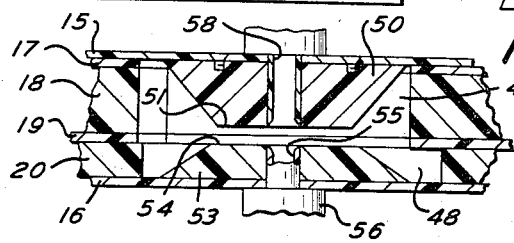
INVENTOR
ROBERT B. ADAMS
BY
*B. T. Wobensmith*
ATTORNEY United States Patent Office 3,373,759
Patented Mar. 19, 1968

3,373,759
FLOW CONTROL APPARATUS
Robert B. Adams, Bethayres, Pa., assignor to Moore Products Co., Spring House, Pa., a corporation of Pennsylvania
Filed Jan. 21, 1965, Ser. No. 426,994
11 Claims. (Cl. 137—81.5)

ABSTRACT OF THE DISCLOSURE

Flow control apparatus having oppositely arranged superposed vortex chambers with fluid selectively delivered to said vortex chambers from a pure fluid proportional diverting valve, the vortex chambers extending to a common outlet.

---

This invention relates to fluid flow control apparatus.

It has heretofore been proposed to control the direction of flow of a jet of fluid in accordance with signal applied to control ports positioned in a jet interaction chamber and to separate the jet into streams having different quantities therein.

It has also heretofore been proposed in the application of Robert B. Adams and Coleman B. Moore, filed Apr. 12, 1963, Ser. No. 272,663, for Flow Control Apparatus, now U.S. Patent No. 3,267,946, to utilize a jet interaction chamber and a vortex chamber, the control of the direction of the fluid jet in the interaction chamber and the vortex chamber determining the impedance action of the vortex chamber.

It is the principal object of the present invention to provide flow control apparatus in which the directional positioning of a fluid jet is utilized to determine the impedance to fluid flow in the apparatus by the utilization of portions of the flow in opposed directions.

It is a further object of the present invention to provide flow control apparatus in which opposed vortex chambers have fluid jets directed thereinto, the control of the distribution of the flow as between the jets determining the impedance action of the apparatus.

It is a further object of the present invention to provide flow control apparatus having a fluid jet divided in controlled relation to provide opposed flow, the proportioning action determining the flow.

It is a further object of the invention to provide fluid flow control apparatus in which accurate control of proportioning can be obtained over a wide range of operating conditions.

It is a further object of the present invention to provide fluid flow control apparatus in which a jet is directionally controlled to determine the flow and in which no mechanical moving parts are employed at or along the controlled jet.

It is a further object of the present invention to provide fluid flow control apparatus in which a jet is directionally controlled to determine the distribution of the flow and in which no mechanical moving parts are employed at or along the controlled jet.

Other objects and advantageous features of the invention will be apparent from the description and claims.

The nature and characteristic features of the invention will be more readily understood from the following description, taken in connection with the accompanying drawings forming part thereof, in which:

FIG. 5 is a vertical sectional view, enlarged, taken approximately on the line 5—5 of FIG. 1;

FIG. 6 is a vertical sectional view, enlarged, taken approximately on the line 6—6 of FIG. 1;

FIG. 7 is a top plan view of a first control plate for providing the passageways and chambers in a specific embodiment of the invention;

FIG. 8 is a top plan view of a second control plate for use with the plate of FIG. 7;

FIG. 9 is a top plan view of a third control plate for use with the plates of FIGS. 7 and 8;

FIG. 10 is a top plan view of a fourth control plate for use with the plates of FIGS. 7, 8 and 9; and FIG. 11 is a view similar to FIG. 2 showing alternative provisions for fluid discharge.

Figure 1:
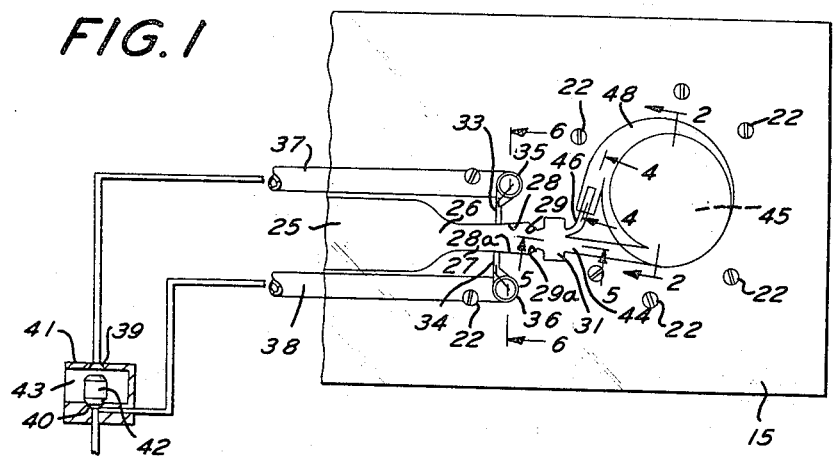
FIGURE 1 is a top plan view of one preferred form of fluid flow control apparatus in accordance with the invention.

It should, of course, be understood that the description and drawings herein are illustrative merely, and the various modifications and changes can be made in the structure disclosed without departing from the spirit of the invention.

Like numerals refer to like parts throughout the several views.

Fluid flow control devices have been proposed in which the flow is controlled by pure fluid interaction of a jet discharging into an interaction chamber which chamber has opposite side walls symmetrical with respect to the longitudinal axis of the jet. In such devices regions on both sides of the jet delineated by the side walls of the interaction chamber and the jet stream had one control connection or opposite control connections contiguous to the entrance location of the jet for input or discharge as determined by the relation of pressure conditions in the chamber to the ambient pressure.

In other fluid flow devices, also, vortex chambers of various shapes and the flow of fluid therein have been known.

The present invention utilizes a jet interaction chamber with opposed vortex chambers to provide a variable impedance to fluid flow.

Referring now more particularly to the drawings, while any preferred construction can be employed, one suitable arrangement includes upper and lower cover plates 15 and 16 with a plurality of control plates therebetween in a sandwich arrangement, the plates having openings and passageways therein as hereinafter explained. The control plates illustrated include a first control plate 17 (FIG. 7), a second control plate 18 (FIG. 8), a third control plate 19 (FIG. 9), and a fourth control plate 20 (FIG. 10).

The plates 15 to 20, inclusive, can be of generally rectangular or other shape as desired with opposite flat faces and can be made of any desired material, such as metal, synthetic resinous plastic or the like, which is not subject to corrosion by the fluid or fluids in contact therewith.

The plates 15, 17, 18, 19, 20, and 16, are secured together in superposed relation in any desired manner with their meeting faces in fluid tight engagement. For this purpose, bolts 22 with their heads engaged with the top plate 15 can extend downwardly through the plates 17, 18, 19 and 20 and in threaded engagement in the bottom plate 16.

A fluid inlet passageway 25 is provided, connected to a supply of the fluid whose flow is to be controlled, and the fluid can be liquid or gaseous, as desired.

The passageway 25 is shown as located in the plate 18 and extends to a nozzle 26 and thence to an interaction chamber 27 which has opposite diverging wall portions 28 and 28a and converging wall portions 29 and 29a with a throat 30 therebeyond connected to an equalizing chamber 31. The nozzle 26 and chamber 27 are shown as provided in the plate 18.

The chamber 31 is formed in the plates 17, 18, 19 and 20, and prevents the transmission of pressure unbalances downstream from propagating upstream of the chamber 31. This type of chamber is shown and described in my prior application for Control Apparatus, filed Dec. 17, 1962, Ser. No. 245,169, now Patent No. 3,187,763.

Extending in the plate 18 to opposite side walls of the chamber 27, and immediately beyond the nozzle 26, control fluid connections 33 and 34 are provided. The fluid connections 33 and 34 are connected by passageways 35 and 36 in the plates 18, 19 and 20 to external pipes 37 and 38 and thereby to ports 39 and 40 in a control valve housing 41. The housing 41 can have a manually operable valve 42 therein for controlling the ports 39 and 40 and the flow of fluid through the pipes 37 and 38 and the fluid connections 33 and 34. The inlet 43 of the housing 41 can be connected to the atmosphere, to a source of pressure, or to a source of vacuum, as desired.

Beyond the equalizing chamber 31, and toward one side thereof a fluid delivery passageway 44 is provided formed in the plates 17, 18, and 19 which communicates tangentially with a counterclockwise vortex chamber 45 also formed in the plates 17, 18, and 19.

A delivery passageway 46 is also provided, toward the other side of the equalizing chamber 31 and separated from the passageway 44 by a divider edge 47 also formed in the plates 18 and 19. The delivery passageway 46 extends downwardly through the plates 17, 18, 19 and 20, and communicates tangentially with a clockwise vortex chamber 48 formed in the plate 20.

The cover plate 15 has a frustoconical insert 50 carried thereby, and extending downwardly in the vortex chamber 45 through the vortex chamber opening 45 in the plate 17 and partially through the vortex chamber opening 45 in the plate 18. The insert 50 has a lower face 51 spaced above the plane of the upper face of the plate 18.

The cover plate 16 has a frustoconical insert 53 carried thereby and extending upwardly in the vortex chamber 48. The insert 53 has an upper face 54 in spaced relation to the face 51 and has mounted therein a central delivery pipe 55 which communicates with a discharge pipe 56. The discharge pipe 56 can be provided with straightening vanes 57 which smooth out the flow and reduce the turning or whorling of the fluid.

Figure 2:
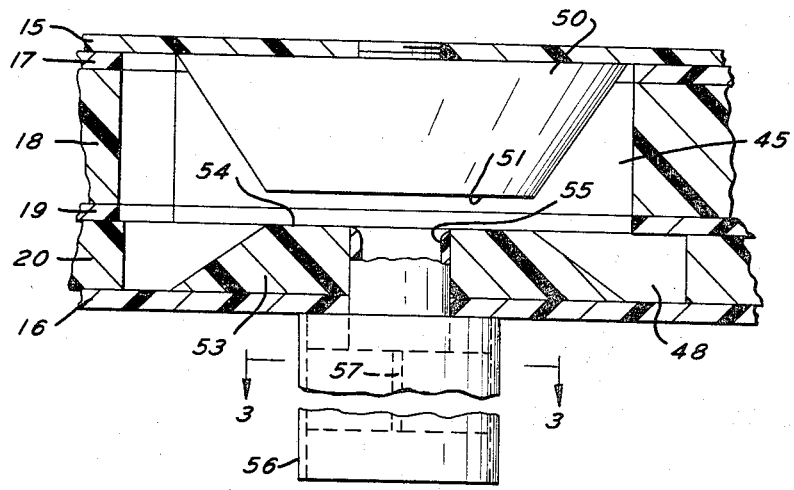
FIG. 2 is a vertical sectional view, enlarged, taken approximately on the line 2—2 of FIG. 1 and showing the opposed vortex chambers.
Figure 3:
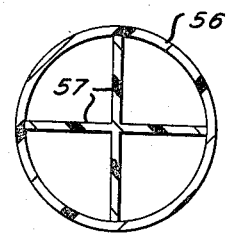
FIG. 3 is a vertical sectional view taken approximately on the line 3—3 of FIG. 2.

In FIG. 11, in place of the single outlet of FIGS. 1 and 2, two outlets are shown from the space between the faces 51 and 54, one of which, the pipe 55 extends downwardly as before, and another of which, the pipe 58 extends upwardly through the insert 50. The insert 50 is secured to the cover plate 15 in any desired manner. The two pipes 55 and 58 can each be of smaller size than where a single delivery pipe is employed, with better flow conditions.

The mode of operation will now be pointed out.

Assume that fluid is supplied through the fluid inlet passageway 25 and the nozzle 26 into the interaction chamber 27.

Figure 4:
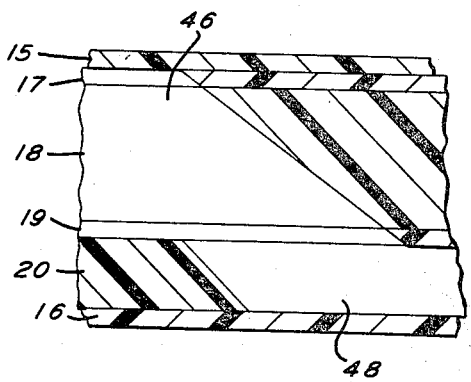
FIG. 4 is a vertical sectional view, enlarged, taken approximately on the line 4—4 of FIG. 1.

If the fluid connections 33 and 34 are controlled so that a higher pressure condition prevails along the wall portion 28a than along the wall portion 28 so that the fluid jet is influenced to move toward the wall portion 28 and will continue along the wall portions 28 and 29 and be directed through the equalizing chamber 31 to the passageway 44 and into the vortex chamber 45 where it moves counterclockwise and between the faces 51 and 54 for discharge through the pipes 55 and the pipe 56, as in FIG. 2, or as in FIG. 4 through the pipe 55 and the pipe 58. If no portion of the fluid is diverted, by the positioning of the jet from the nozzle 26, to the passageway 46, all the fluid passes through passageway 44, and maximum impedance conditions prevail with respect to the chambers 45 and 48 and between the faces 51 and 54.

If now, by change of the position of the valve 42, the pressure conditions along the wall portions 28 and 28a are changed so that the pressure along the wall portion 28a is reduced or along the wall portion 28 is increased, or both, the distribution of fluid as between the passageways 44 and 46 will be changed. The portion of the fluid from the nozzle 26 delivered through the passageway 46 passes to the lower vortex chamber 48 where it moves clockwise and in opposition at the meeting locations of the chambers 45 and 48, and between the faces 51 and 54, so as to substantially decrease the vortex action to provide decreased impedance. Intermediate restrictive action can be effected.

The minimum impedance effect will be obtained when the clockwise swirl in chamber 48 cancels the counterclockwise swirl in chamber 45 to give minimum or zero swirl between the faces 51 and 54.

I claim:

1. Fluid flow control apparatus comprising a device having a fluid interaction chamber with opposite side walls, a nozzle communicating with said interaction chamber between said walls, a supply of fluid connected to said nozzle for the delivery of a fluid jet from said nozzle into said interaction chamber, at least one control port communicating with said interaction chamber at one of said side walls, a pair of separate fluid delivery connections beyond said interaction chamber with respect to which the fluid from the interaction chamber is distributed, a pair of parallel vortex chambers one superposed on the other and shaped for opposite directions of fluid rotation and having inlets to which said delivery connections are respectively connected, said vortex chambers having portions in facing relation and being in communication over their entire facing portions, and said vortex chambers extending to a common fluid outlet.

2. Fluid flow control apparatus comprising a source of fluid, a pure fluid proportional diverting valve connected to said source and having a pair of delivery legs, first and second parallel vortex chambers of opposite hand having said delivery legs connected respectively thereto for fluid delivery thereinto, said vortex chambers having portions in facing relation and being in communication over their entire facing portions, said vortex chambers extending to a common fluid outlet.

3. Fluid flow control apparatus comprising a source of fluid, a pure fluid proportional diverting valve connected to said source and having a pair of delivery legs, and vortex chamber means having parallel vortex chambers one superposed on the other to which said legs are respectively connected for directing the fluid from said legs in opposed relation.

4. Fluid flow control apparatus as defined in claim 3 in which both said vortex chambers are connected in parallel relation to a single outlet.

5. Fluid flow control apparatus as defined in claim 3 in which said vortex chamber means has a plurality of opposed discharge passageways.

6. Fluid flow control apparatus comprising a source of fluid, a pure fluid proportional diverting valve connected to said source and having a pair of delivery legs, and vortex chamber means having parallel vortex chambers one superposed on the other for accommodating clockwise and counterclockwise fluid rotation in opposition, one of said legs being connected to one of said vortex chambers for delivering fluid for clockwise rotation and the other of said legs being connected to the other of said vortex chambers for delivering fluid for counterclockwise rotation.

7. Fluid flow control apparatus comprising
a housing having a space therein with an upper vortex chamber and a lower vortex chamber,
said upper vortex chamber being in superposed parallel relation to said lower vortex chamber and said chambers having portions in facing relation and being in communication over their entire facing portions,
said first vortex chamber having a predetermined direction for fluid movement and said second vortex chamber having an opposite predetermined direction for fluid movement, said chambers extending to a common outlet portion, a fluid supply connection, and members with which said fluid supply connection is in communication for controlling the relative distribution of the fluid from said supply connection to said vortex chambers.

8. Fluid flow control apparatus as defined in claim 7 in which said common outlet portion includes oppositely extending delivery passageways.

9. Fluid flow control apparatus as defined in claim 7 in which
said members include a fluid interaction chamber into which a fluid jet from said supply connection is initially directed.

10. Fluid flow control apparatus as defined in claim 7 in which
said members include a fluid interaction chamber with a nozzle for initially directing a fluid jet thereinto from said supply connection,
said interaction chamber has opposite side walls, and
said last member includes fluid connections to said side walls controlling the positioning of the jet.

11. Fluid flow control apparatus as defined in claim 7 in which
said vortex chambers have a common central portion of lesser axial dimension than the peripheral portions of said vortex chambers.

References Cited
UNITED STATES PATENTS

| | | | |
|---|---|---|---|
| 3,148,691 | 9/1964 | Greenblott | 137—81.5 |
| 3,158,166 | 11/1964 | Warren | 137—81.5 |
| 3,171,421 | 3/1965 | Joesting | 137—81.5 |
| 3,193,197 | 7/1965 | Bauer | 137—81.5 X |
| 3,195,303 | 7/1965 | Widell | 137—81.5 X |
| 3,198,214 | 8/1965 | Lorenz | 137—81.5 X |
| 3,209,774 | 10/1965 | Manion | 137—81.5 |
| 3,216,439 | 11/1965 | Manion | 137—81.5 |
| 3,219,048 | 11/1965 | Palmisano | 137—81.5 |
| 3,233,621 | 2/1966 | Manion | 137—81.5 |
| 3,238,959 | 3/1966 | Bowles | 137—81.5 |

M. CARY NELSON, *Primary Examiner.*

S. SCOTT, *Assistant Examiner.*